(12) United States Patent
Watanabe

(10) Patent No.: US 9,807,222 B2
(45) Date of Patent: Oct. 31, 2017

(54) COMMUNICATION APPARATUS, METHOD OF CONTROLLING SAME, AND STORAGE MEDIUM

(71) Applicant: CANON KABUSHIKI KAISHA, Tokyo (JP)

(72) Inventor: Hajime Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/232,077

(22) Filed: Aug. 9, 2016

(65) Prior Publication Data

US 2017/0064063 A1  Mar. 2, 2017

(30) Foreign Application Priority Data

Aug. 27, 2015 (JP) .................. 2015-168137

(51) Int. Cl.
| | | |
|---|---|---|
| *H04B 5/00* | (2006.01) | |
| *H04M 1/725* | (2006.01) | |
| *H04B 5/02* | (2006.01) | |
| *H04W 36/30* | (2009.01) | |
| *H04W 88/06* | (2009.01) | |
| *H04W 84/12* | (2009.01) | |

(52) U.S. Cl.
CPC ........ *H04M 1/7253* (2013.01); *H04B 5/0031* (2013.01); *H04B 5/02* (2013.01); *H04W 36/30* (2013.01); *H04M 2250/02* (2013.01); *H04W 84/12* (2013.01); *H04W 88/06* (2013.01)

(58) Field of Classification Search
CPC .............................. H04M 1/7253; H04B 5/02

USPC .................................... 455/41.1, 41.2, 41.3
See application file for complete search history.

(56) References Cited

U.S. PATENT DOCUMENTS

| | | | | |
|---|---|---|---|---|
| 2007/0038735 | A1* | 2/2007 | Tsunoda | H04N 1/00127 709/223 |
| 2007/0121541 | A1* | 5/2007 | Matsuo | H04L 12/2856 370/328 |
| 2009/0180451 | A1* | 7/2009 | Alpert | H04W 72/1215 370/338 |

(Continued)

FOREIGN PATENT DOCUMENTS

JP  2011-151746  8/2011

*Primary Examiner* — Md Talukder
(74) *Attorney, Agent, or Firm* — Fitzpatrick, Cella, Harper & Scinto

(57) ABSTRACT

A communication apparatus includes a memory that stores instructions and a processor that executes the instructions to communicate with an external apparatus. In a case where an operation mode of a communication apparatus is a predetermined operation mode for transferring predetermined transfer target data, communication is enabled by a first wireless communication interface. In a case where the operation mode of the communication apparatus is not the predetermined operation mode and the external apparatus has been registered in advance, communication is enabled by a second wireless communication interface. In a case where the operation mode of the communication apparatus is not the predetermined operation mode and the external apparatus has not been registered in advance, processing is enabled for registering, using the second wireless communication interface, the external apparatus.

11 Claims, 12 Drawing Sheets

(56) References Cited

U.S. PATENT DOCUMENTS

| | | | |
|---|---|---|---|
| 2010/0234071 A1* | 9/2010 | Shabtay | H04B 7/0408 455/562.1 |
| 2010/0254349 A1* | 10/2010 | Aibara | H04W 36/385 370/331 |
| 2010/0283582 A1* | 11/2010 | Fujita | H04N 1/00236 340/7.37 |
| 2011/0177780 A1* | 7/2011 | Sato | H04W 36/14 455/41.1 |
| 2014/0086398 A1* | 3/2014 | Tabushi | H04N 1/0022 379/100.08 |
| 2014/0179317 A1* | 6/2014 | Tanaka | H04W 60/00 455/435.2 |
| 2014/0187163 A1* | 7/2014 | Fujita | H04W 4/008 455/41.2 |
| 2015/0054852 A1* | 2/2015 | Ohnuma | G09G 5/14 345/635 |
| 2016/0021230 A1* | 1/2016 | Watanabe | H04M 1/7253 348/552 |
| 2016/0072941 A1* | 3/2016 | Takagi | H04M 1/72527 455/557 |
| 2016/0105796 A1* | 4/2016 | Iko | H04W 4/008 370/338 |
| 2016/0227014 A1* | 8/2016 | Takagi | H04M 1/7253 |
| 2017/0064063 A1* | 3/2017 | Watanabe | H04M 1/7253 |

\* cited by examiner

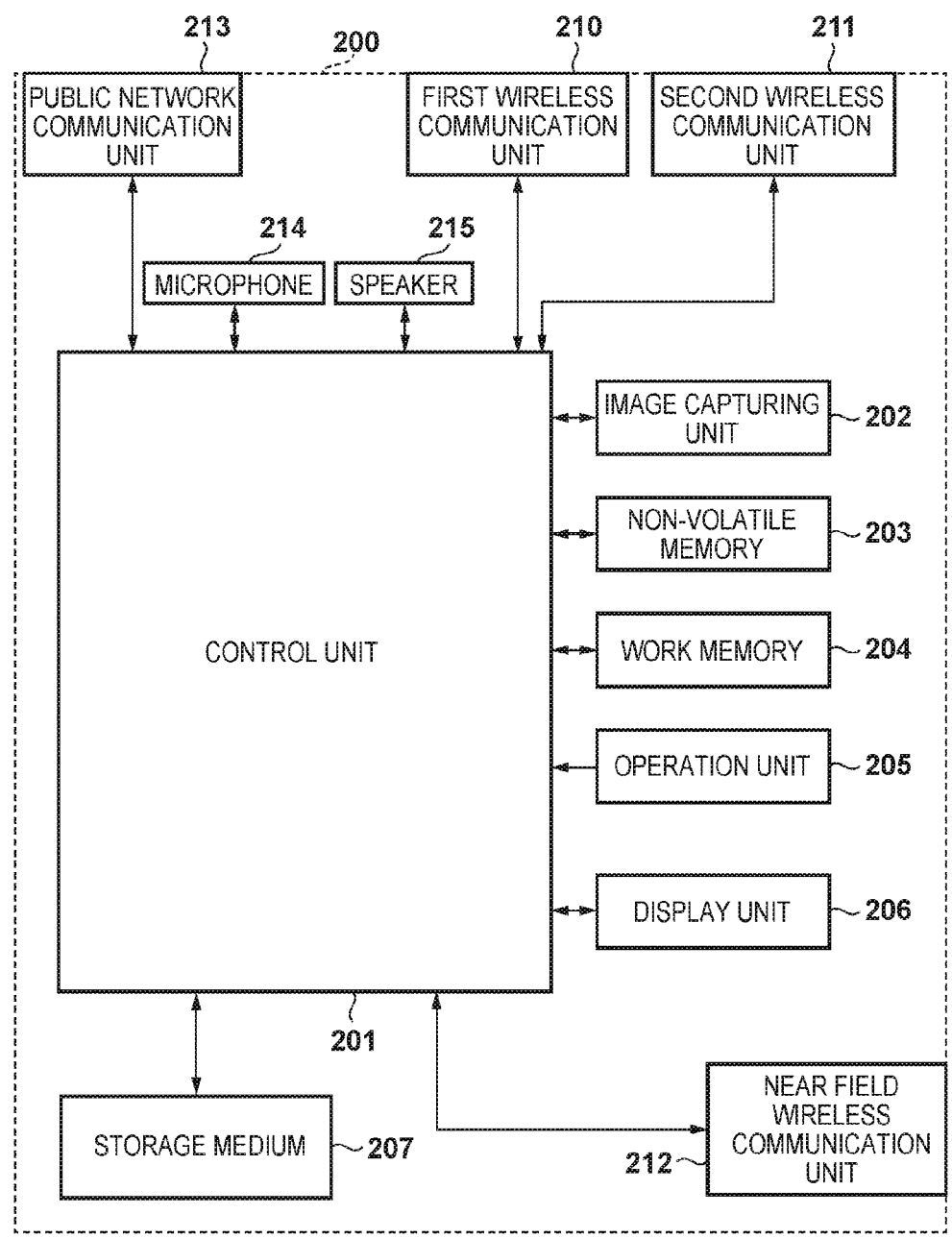

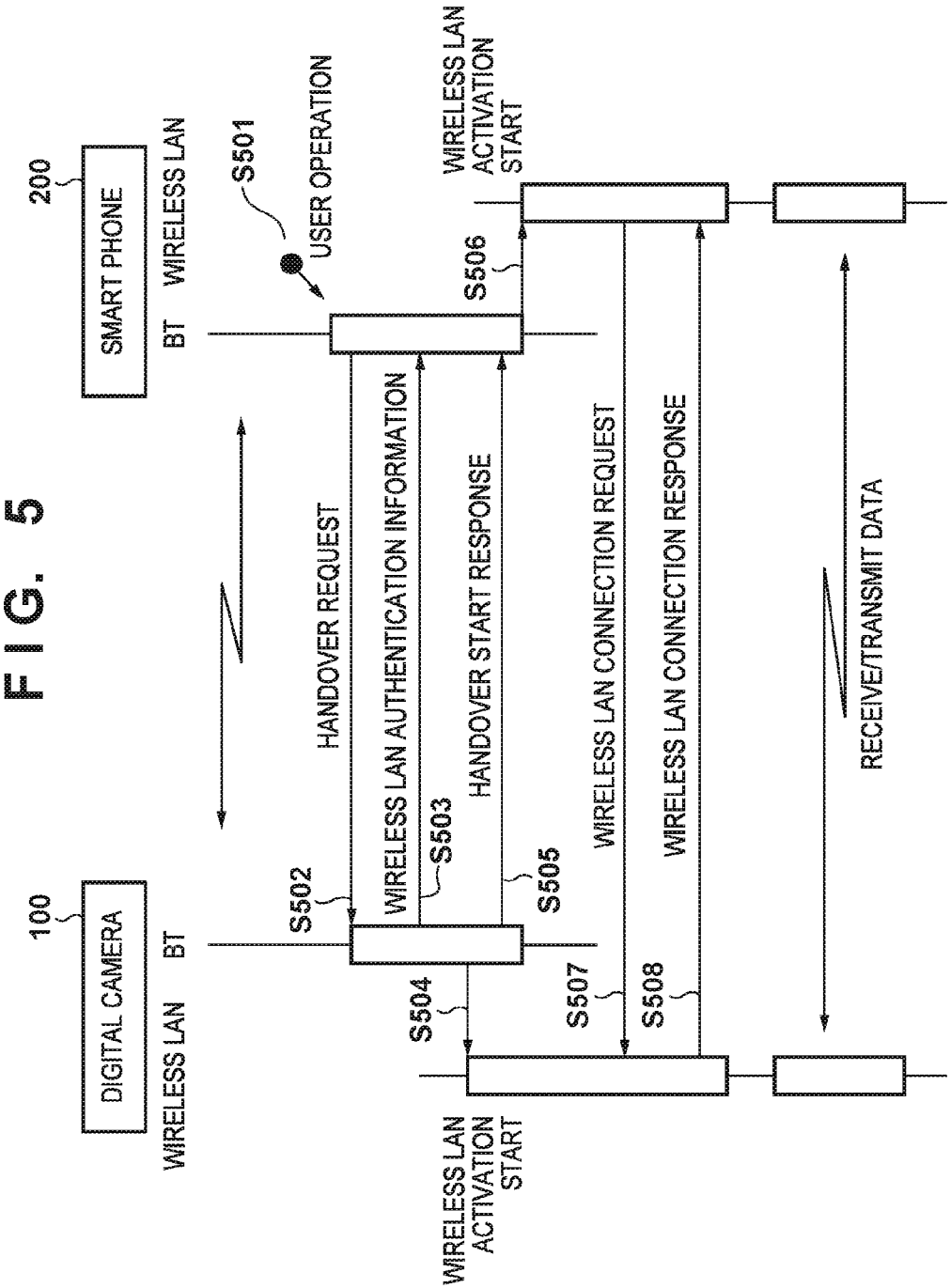

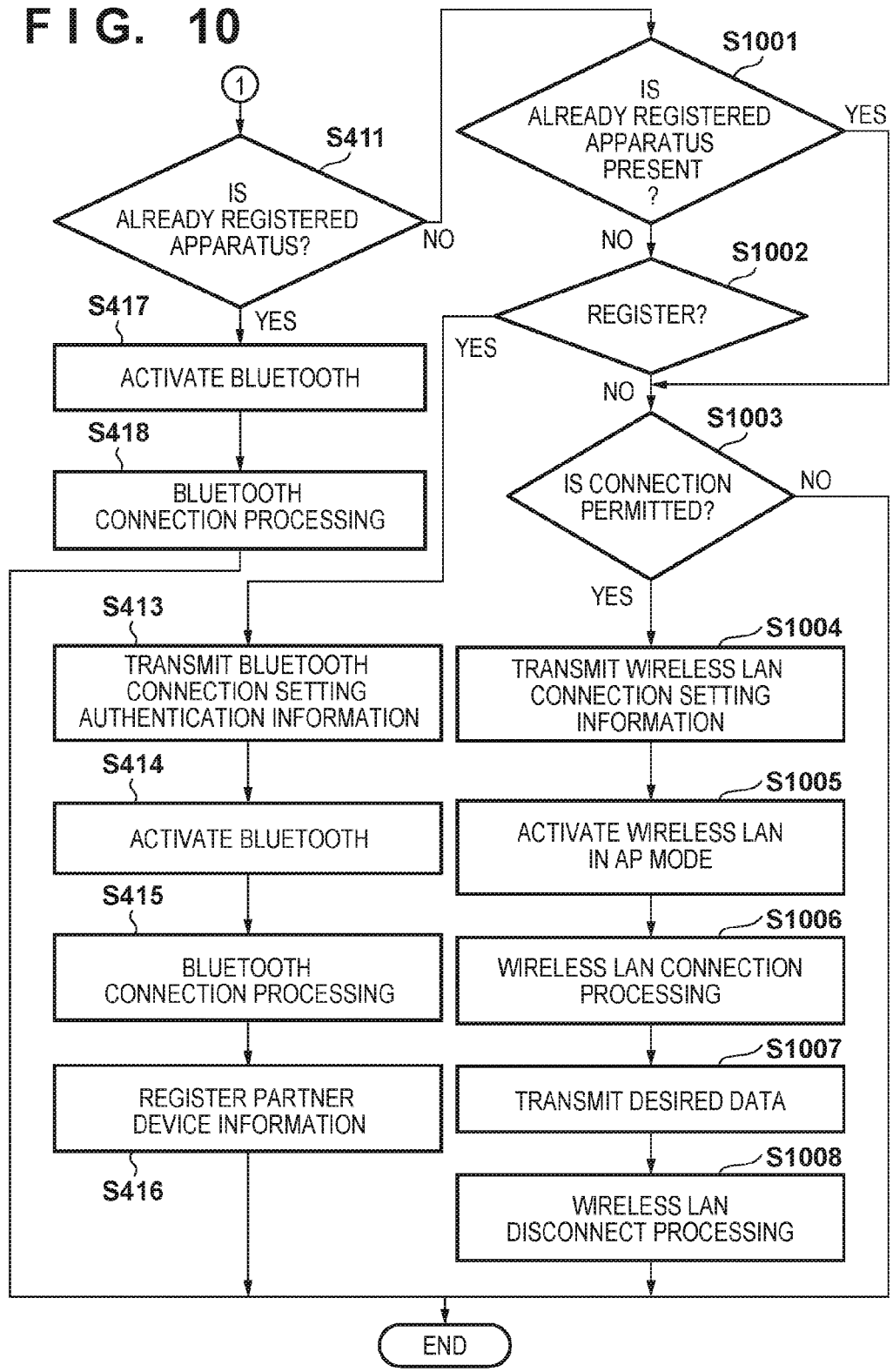

COMMUNICATION APPARATUS, METHOD OF CONTROLLING SAME, AND STORAGE MEDIUM

BACKGROUND OF THE INVENTION

Field of the Invention

The present invention relates to a communication apparatus, a method of controlling same, and a storage medium.

Description of the Related Art

In recent years, a system is known in which image data is captured by a communication apparatus equipped with imaging capabilities, and, when an information processing apparatus that is a communication partner is approached, the image data is shared by transferring it from the communication apparatus to the information processing apparatus.

In such a system, firstly the communication apparatus and the information processing apparatus are caused to approach, and near field wireless communication is used to exchange setting information necessary for authentication of wireless communication. Thereafter, based on the exchanged setting information, fast wireless communication for which a communicable range is broader is established, and a switch to the established wireless communication (a so-called handover) is performed.

Japanese Patent Laid-Open No. 2011-151746 discloses a technique in which a communication apparatus uses NFC (Near Field Communication) that is near field wireless communication to perform a handover to Bluetooth (registered trademark). For a handover technique that uses near field wireless communication, other than switching to wireless communication by Bluetooth, a technique stipulated in IEEE 802.11 of establishing wireless communication by a so-called wireless LAN and then switching to the wireless communication is known.

Incidentally, in communication apparatuses of recent years, those equipped with a plurality of wireless communication methods are spreading. In such a communication apparatus, on a per-purpose basis it is possible to respectively use, for example, a wireless communication method having a low power consumption such as Bluetooth when periodically sharing a small amount of data, and a fast wireless communication method such as a wireless LAN when sharing a large amount of data such as an image.

However, in a case of further comprising a handover technique in which an apparatus equipped with a plurality of wireless communication methods uses near field wireless communication, a necessity arises in determining which communication method should a handover be made to from communication that uses near field wireless communication. In other words, if a user wants to share data between apparatuses, providing good usability by appropriately determining a wireless communication method to handover to is desired.

SUMMARY OF THE INVENTION

The present invention has been made in consideration of the aforementioned problems, and realizes a technique with which it is possible to use an appropriate communication method in a case of sharing data with an external apparatus equipped with a plurality of wireless communication methods. In order to solve the aforementioned problems, one aspect of the present invention provides a communication apparatus, comprising: a first wireless communication unit configured to communicate with an external apparatus by a first communication method; a second wireless communication unit configured to communicate by a second communication method different to the first communication method; a near field wireless communication unit configured to perform communication by near field wireless communication; and an enabling unit configured to, in accordance with having performed near field wireless communication with an external apparatus by using the near field wireless communication unit, enable communication by the first wireless communication unit or the second wireless communication unit to perform communication with the external apparatus, wherein the enabling unit, if an operation mode of the communication apparatus is a predetermined operation mode for transferring predetermined transfer target data, enables communication by the first wireless communication unit, and if the operation mode of the communication apparatus is not the predetermined operation mode, enables communication by the second wireless communication unit.

Another aspect of the present invention provides a control method of a communication apparatus which comprises a first wireless communication unit for communicating by a first communication method with an external apparatus, a second wireless communication unit for communicating by a second communication method different to the first communication method, and a near field wireless communication unit for communicating by near field wireless communication, the method having: enabling, in accordance with having performed near field wireless communication with an external apparatus by using the near field wireless communication unit, communication by the first wireless communication unit or the second wireless communication unit to perform communication with the external apparatus; wherein the enabling, if an operation mode of the communication apparatus is a predetermined operation mode for transferring predetermined transfer target data, enables communication by the first wireless communication unit, and if the operation mode of the communication apparatus is not the predetermined operation mode, enables communication by the second wireless communication unit.

Still another aspect of the present invention provides a non-transitory computer-readable storage medium storing a program for causing a computer to function as a communication apparatus comprising a first wireless communication unit for communicating by a first communication method with an external apparatus, a second wireless communication unit for communicating by a second communication method different to the first communication method, and a near field wireless communication unit for communicating by near field wireless communication, the program comprising: code to cause an enabling unit to, in accordance with having performed near field wireless communication with an external apparatus by using the near field wireless communication unit, enable communication by the first wireless communication unit or the second wireless communication unit to perform communication with the external apparatus, wherein the code to cause the enabling unit, if an operation mode of the communication apparatus is a predetermined operation mode for transferring predetermined transfer target data, to enable communication by the first wireless communication unit, and if the operation mode of the communication apparatus is not the predetermined operation mode, to enable communication by the second wireless communication unit.

According to the present invention, it becomes possible to use an appropriate communication method in a case of sharing data with an external apparatus equipped with a plurality of wireless communication methods.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram illustrating a functional configuration example of a smart phone as an example of an information processing apparatus according to embodiments of the present invention.

FIG. 5 is a sequence diagram for handover processing that uses communication by Bluetooth, according to embodiments.

FIG. 10 is a flowchart illustrating a series of operations of handover processing that uses near field wireless communication according to the second embodiment.

DESCRIPTION OF THE EMBODIMENTS

First Embodiment

Exemplary embodiments of the present invention will be described hereinafter in detail, with reference to the accompanying drawings. Note that explanation is given below of an example of applying the present invention to a digital camera provided with two types of wireless communication units other than for near field wireless communication, as an example of a communication apparatus. But, the present invention can also be applied to an electronic device equipped with wireless communication as described above, and is not limited to a digital camera. Such a device includes, for example, an electronic device such as a mobile telephone, a tablet device, or a personal computer, an information terminal of a watch-type or a glasses-type, an in-vehicle device, a medical device, or the like.

<Configuration of Digital Camera 100>

Figure 1A:
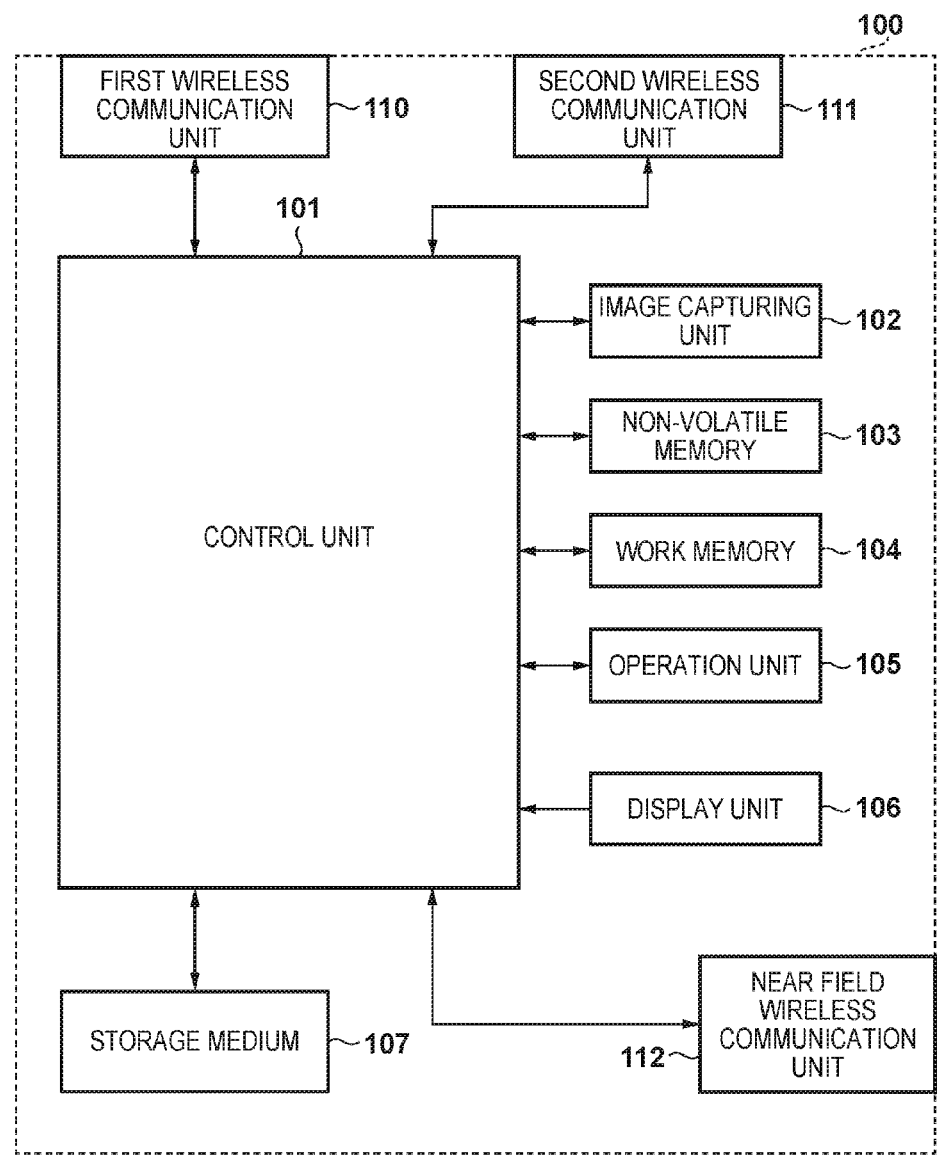
FIGS. 1A through 1C are perspective views and a block diagram illustrating a functional configuration example of a digital camera as an example of a communication apparatus according to embodiments of the present invention.

FIG. 1A is a block diagram illustrating a functional configuration example of a digital camera 100 as an example of a communication apparatus according to the present embodiment. Note that one or more functional blocks illustrated in FIGS. 1A through 1C may be realized by hardware such as an ASIC or a programmable logic array (PLA), or may be realized by a programmable processor such as an MPU or a CPU executing software. Also, these may be realized by a combination of software and hardware. Accordingly, in the following explanation, even in a case where different functional blocks are recited as the subject of operations, it is possible that this may be realized by the same hardware as the subject.

A control unit 101 includes a CPU or an MPU for example, and controls each unit of the digital camera 100 by loading a later-described program that is stored in a non-volatile memory 103 into a work memory 104, and executing it. In addition, as described later, the control unit 101 performs control processing such as activation or disconnection for each type of communication according to a plurality of wireless communication methods.

An image capturing unit 102 is configured by, for example, an optical lens unit, an optical system for controlling an aperture/zoom/focus or the like, an image capturing element for converting light (a video image) that is introduced via the optical lens unit into an electric video image signal. As the image capturing element, commonly a CMOS (Complementary Metal Oxide Semiconductor) or a CCD (Charge Coupled Device) is used. In accordance with control by the control unit 101, the image capturing unit 102 converts a subject light beam formed by a lens included in the image capturing unit 102 into the electric signal by the image capturing element. In addition to converting the electric signal into digital data, the image capturing unit 102 applies noise reduction processing or the like, and outputs it as image data. In the digital camera 100 of the present embodiment, image data is stored in a storage medium 107 in accordance with a DCF (Design Rule of Camera File System) specification.

The non-volatile memory 103 includes a non-volatile memory that is capable of deleting/recording electrically, such as a semiconductor memory for example, and stores, for example, a program that is described later and executed by the control unit 101.

The work memory 104 includes a volatile memory, and is used as a buffer memory to temporarily hold image data captured by the image capturing unit 102, a memory for image display to a display unit 106, a work area of the control unit 101, or the like.

An operation unit 105 includes a power button for a user to instruct ON/OFF of a power source of the digital camera 100, a release switch for instructing capturing, and a reproduction button for instructing reproduction of the image data, for example. The operation unit 105 is used for accepting, from a user, an instruction that the user makes with respect to the digital camera 100. It further includes an operation member, such as a dedicated connection button, for initiating communication with an external apparatus via a first wireless communication unit 110 or a second wireless communication unit 111 that are described later. A touch panel formed in the display unit 106, which is described later, is also included in the operation unit 105. Note that the release switch has a SW1 and a SW2. The SW1 becomes ON by the release switch entering a so-called half-stroke state. Because of this, an instruction is accepted for performing imaging preparation, such as AF (auto focus) processing, AE (automatic exposure) processing, AWB (auto white balance) processing, EF (pre-flashing) processing, or the like. The SW2 becomes ON by the release switch entering a so-called full pressing state. Because of this, an instruction for performing capturing is accepted.

The display unit 106 includes a display panel of a liquid crystal, OLED, or the like, and performs, for example, display of a viewfinder image, display of captured image data, text display for an interactive operation, or the like.

Note that the display unit 106 does not necessarily need to be integrated in the digital camera 100. Configuration may be taken such that the digital camera 100 can connect to an internal or external display unit 106 and has at the least a display control function for controlling display of the display unit 106.

The storage medium 107 can store image data output from the image capturing unit 102. The storage medium 107 may be configured so that attachment/removal with respect to the digital camera 100 is possible, or may be integrated in the digital camera 100. In other words, the digital camera 100 has a unit for accessing at least the storage medium 107.

The first wireless communication unit 110 includes an interface for connecting to and communicating with an external apparatus by a so-called wireless LAN in accordance with an IEEE 802.11 specification, for example. The digital camera 100 of the present embodiment can communicate with an external apparatus via the first wireless communication unit 110. For example, it is possible to transmit image data generated by the image capturing unit 102 to an external apparatus via the first wireless communication unit 110. The control unit 101 realizes communication with an external apparatus by controlling the first wireless communication unit 110.

The second wireless communication unit 111 includes an interface for connecting to and communicating with an external apparatus by so-called Bluetooth in accordance with an IEEE 802.15 specification, for example. The digital camera 100 of the present embodiment can communicate data with an external apparatus via the second wireless communication unit 111. For example, it is possible to receive a control command from an external apparatus with respect to the digital camera 100, via the second wireless communication unit 111. The control unit 101 realizes wireless communication with an external apparatus by controlling the second wireless communication unit 111. Note that the second wireless communication unit 111 can perform wireless communication with reduced power consumption in comparison to the first wireless communication unit 110.

A near field wireless communication unit 112 includes an antenna for near field wireless communication, a modulation/demodulation circuit for processing a wireless signal, and a communication controller, for example. The near field wireless communication unit 112 realizes contactless proximity communication in accordance with an ISO/IEC 18092 standard (so-called NFC: Near Field Communication) by outputting a modulated wireless signal from the antenna, and demodulating a wireless signal received by the antenna. The near field wireless communication unit 112 of the present embodiment is arranged on a side portion of the digital camera 100.

Between the digital camera 100 and a smart phone 200 described later, near field wireless communication is initiated by causing each other's near field wireless communication unit to be close to one another. Note that, if using near field wireless communication units to cause a connection, there is not necessarily a need to cause the near field wireless communication units to touch each other. Because communication is possible even if the near field wireless communication units are at a distance of about several centimeters, for example, to connect the devices mutually it is sufficient if they are brought close to a range in which near field wireless communication is possible. In the following explanation, bringing devices closer together to be within this range in which near field wireless communication is possible is also referred to as causing to neighbor.

In addition, if the near field wireless communication units are at a range in which near field wireless communication is impossible, communication is not started. In addition, when the near field wireless communication units are at a range in which near field wireless communication is possible and the devices have a communication connection, if the near field wireless communication unit 112 is distanced to a range at which near field wireless communication is impossible, the communication connection is canceled. Note that contactless proximity communication that the near field wireless communication unit 112 realizes is not limited to NFC, and other wireless communication may be employed. For example, contactless proximity communication in accordance with an ISO/IEC 14443 standard may be employed as contactless proximity communication that the near field wireless communication unit 112 realizes.

Note that, a communication rate of communication by the first wireless communication unit 110 may be faster than a communication rate of communication by the near field wireless communication unit 112. In addition, communication by the first wireless communication unit 110 or the second wireless communication unit 111 has a range in which communication is possible that is broader than communication by the near field wireless communication unit 112. Meanwhile, in communication by the near field wireless communication unit 112, because it is possible to specify a communication partner by having a communicable range that is narrow, selection processing of a communication partner necessary in communication by the first wireless communication unit 110 and the second wireless communication unit 111 is not required. In other words, it is possible to easily initiate communication by using the first wireless communication unit 110 or the second wireless communication unit 111.

Note that, the first wireless communication unit 110 of the digital camera 100 in the present embodiment has an AP mode for operating as an access point in an infrastructure mode, and a CL mode for operating as a client in the infrastructure mode. By causing the first wireless communication unit 110 to operate in the CL mode, the digital camera 100 in the present embodiment can operate as a CL device in an infrastructure mode. If the digital camera 100 operates as a CL device, by connecting to an AP device in a periphery, it is possible to participate in a network formed by the AP device. In addition, by causing the first wireless communication unit 110 to operate in the AP mode, the digital camera 100 in the present embodiment is a kind of an AP, but it can also operate as a simple AP (hereinafter, a simple AP) for which functions are limited. When the digital camera 100 operates as a simple AP, the digital camera 100 forms a network by itself. An apparatus in a periphery of the digital camera 100 can recognize the digital camera 100 as an AP device, and participate in a network formed by the digital camera 100. A program for causing the digital camera 100 to operate as described above is assumed to be held in the non-volatile memory 103.

Note that although the digital camera 100 in the present embodiment is a type of an AP, for example, it is a simple AP that does not have a gateway function for transferring data received from a CL device to an Internet provider or the like. In a simple AP, even if data is received from another external apparatus participating in a network formed by the digital camera 100, it is not possible to transfer this to a network such as the Internet.

In the present embodiment, a communication rate of communication by the second wireless communication unit 111 may be faster than a communication rate of communication by the near field wireless communication unit 112. In addition, communication by the second wireless communication unit 111 has a range in which communication is possible that is broader than communication by the near field wireless communication unit 112. Note that, a communication rate of communication by the first wireless communication unit 110 may be slower than a communication rate by the second wireless communication unit 111. In addition, a communicable range for communication by the second wireless communication unit 111 is about several meters, for example, and is similar or narrower in comparison to a communicable range for communication by the first wireless communication unit 110. In addition, power consumption by the second wireless communication unit 111 is sufficiently lower than the power consumption at a time of communication by the first wireless communication unit 110. Therefore, in the present embodiment, even if there is no data to communicate between the digital camera 100 and an external apparatus, the control unit 101 is configured to maintain a communication connection via the second wireless communication unit.

Figure 1B:
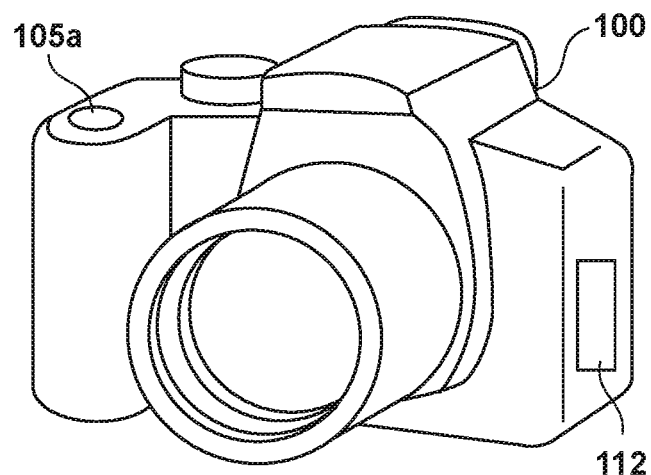
Figure 1C:
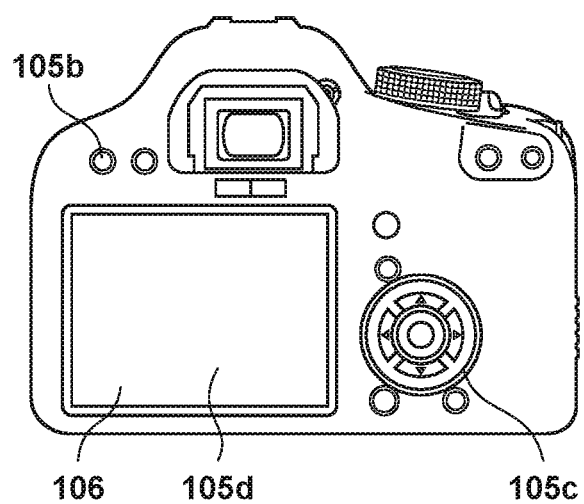

Next, explanation is given regarding an outer appearance of the digital camera 100. FIG. 1B and FIG. 1C are views illustrating an example of an outer appearance of the digital camera 100. A release switch 105a, a reproduction button 105b, a directional key 105c, and a touch panel 105d are operation members that are included in the operation unit 105 previously described. In addition, the display unit 106 displays an image obtained as a result of capturing by the image capturing unit 102. In addition, the digital camera 100 of the present embodiment has an antenna portion of the near field wireless communication unit 112 on a side surface of the camera case. It is possible to establish near field wireless communication with the external apparatus by bringing near field wireless communication units of the digital camera 100 and the external apparatus close to each other at a certain distance.

<Configuration of Smart Phone 200>

FIG. 2 is a block diagram for illustrating a functional configuration example of the smart phone 200 as an example of an information processing apparatus that is an external apparatus in the present embodiment. Note that although mention is given here regarding a smart phone as an example of an information processing apparatus, for example the information processing apparatus may also be a digital camera with a wireless function, a tablet device, a watch-type or glasses-type information terminal, a personal computer, or the like.

A control unit 201 includes a CPU or an MPU for example, and controls each unit of the smart phone 200 by loading a later-described program that is stored in a non-volatile memory 203 into a work memory 204, and executing it.

An image capturing unit 202 converts a subject light beam formed by a lens included in the image capturing unit 202 into an electric signal, performs noise reduction processing or the like, and outputs digital data as image data. After captured image data is stored in a buffer memory, predetermined calculations are performed in the control unit 201, and the image data is stored in a storage medium 207.

The non-volatile memory 203 includes a non-volatile memory that can be electrically deleted/recorded to, and stores an OS (operating system) that is basic software that the control unit 201 executes, and an application that cooperates with this OS to realize a practical function. In addition, in the present embodiment, the non-volatile memory 203 stores an application for communicating with the digital camera 100.

The work memory 204 includes a volatile memory, and is used as a memory for image display for a display unit 206, a work area of the control unit 201, or the like.

An operation unit 205 includes operation members such as a power button for a user to instruct ON/OFF of a power source of the smart phone 200, and a touch panel formed in the display unit 206, for example. The operation unit 205 is used for accepting, from a user, an instruction with respect to the smart phone 200.

The display unit 206 includes a display panel of a liquid crystal, OLED, or the like, and performs, for example, display of image data, text display for an interactive operation, or the like. Note that the display unit 206 does not necessarily need to be included by the smart phone 200. Configuration may be taken such that the smart phone 200 can connect to the display unit 206 and has at the least a display control function for controlling display of the display unit 206.

The storage medium 207 can store image data output from the image capturing unit 202. The storage medium 207 may be configured so that attachment/removal with respect to the smart phone 200 is possible, or may be integrated in the smart phone 200. In other words, it is sufficient if the smart phone 200 has a unit that can access at least the storage medium 207.

A first wireless communication unit 210 includes an interface for communicating with an external apparatus by a so-called wireless LAN in accordance with an IEEE 802.11 specification, for example. In the present embodiment, the control unit 201 can connect with the digital camera 100 and communicate data via the first wireless communication unit 210. Note that a connection with the digital camera 100 may be a direct connection, or may be a connection via an access point. As a protocol for communicating data, it is possible to use PTP/IP (Picture Transfer Protocol over Internet Protocol) through a wireless LAN, for example. Note that communication with the digital camera 100 is not limited to this.

A second wireless communication unit 211 includes an interface for communicating with an external apparatus by so-called Bluetooth in accordance with an IEEE 802.15 specification, for example. The smart phone 200 can exchange data with an external apparatus via the second wireless communication unit 211. For example, it is possible to transmit a control command from the smart phone 200 with respect to an external apparatus, via the second wireless communication unit 211. The control unit 201 realizes wireless communication with an external apparatus by controlling the second wireless communication unit 211.

A near field wireless communication unit 212 includes a communication unit for realizing contactless short range communication with an external apparatus. The near field wireless communication unit 212 is configured from an antenna for wireless communication, a modulation/demodulation circuit for processing a wireless signal, and a communication controller, for example. The near field wireless communication unit 212 realizes contactless short range communication by output a modulated wireless signal from an antenna, and demodulating a wireless signal received by the antenna. Here, non-contact communication in accordance with an ISO/IEC 18092 standard (so-called NFC) is realized. Upon receiving a data read request from another device, the near field wireless communication unit 212 outputs response data based on data stored in the non-volatile memory 203. In the present embodiment, the smart phone 200 operates in a card reader mode, a card writer mode, and a P2P mode defined in an NFC standard through the near field wireless communication unit 212, and mainly acts as an Initiator. In contrast, the digital camera 100 mainly acts as a target via the near field wireless communication unit 112.

A public network communication unit 213 is an interface used when performing public wireless communication. The smart phone 200 can call another device via the public network communication unit 213. In this case, the control unit 201 realizes the call by performing input and output of a voice signal via a microphone 214 and a speaker 215. In the present embodiment, the control unit 201 can connect to a public network via the public network communication unit 213.

<Overview of Present Invention>

Figure 3A:
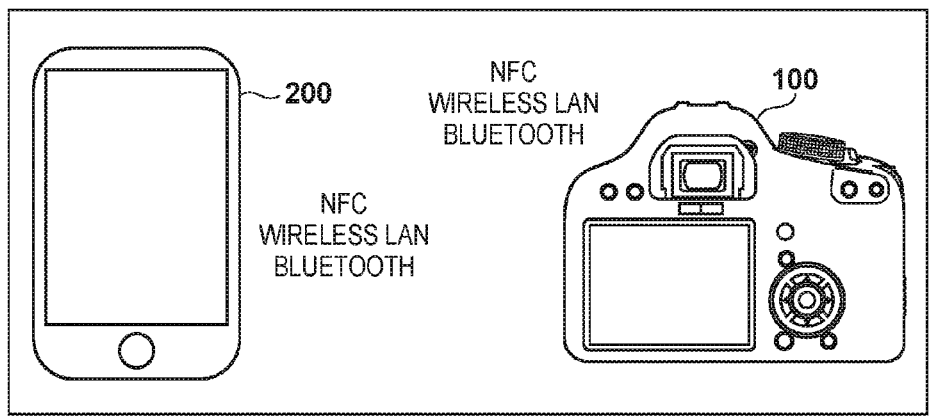
FIGS. 3A through 3C are views for explaining an overview of handover processing according to embodiments.
Figure 3B:
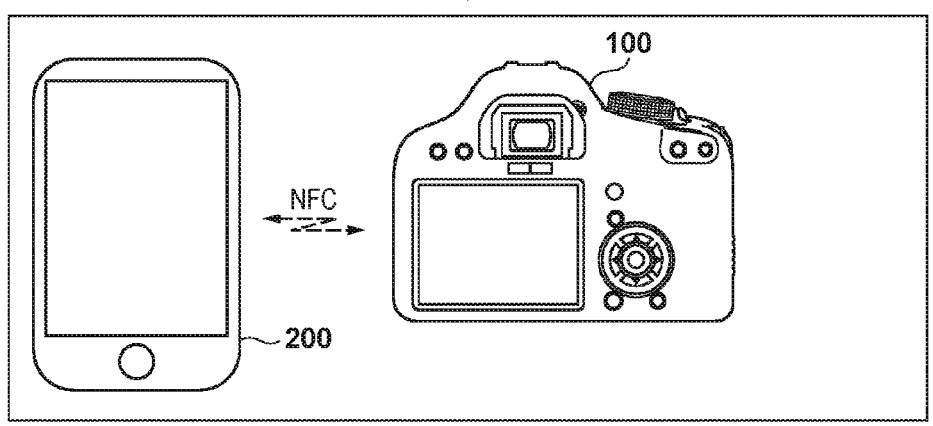
Figure 3C:
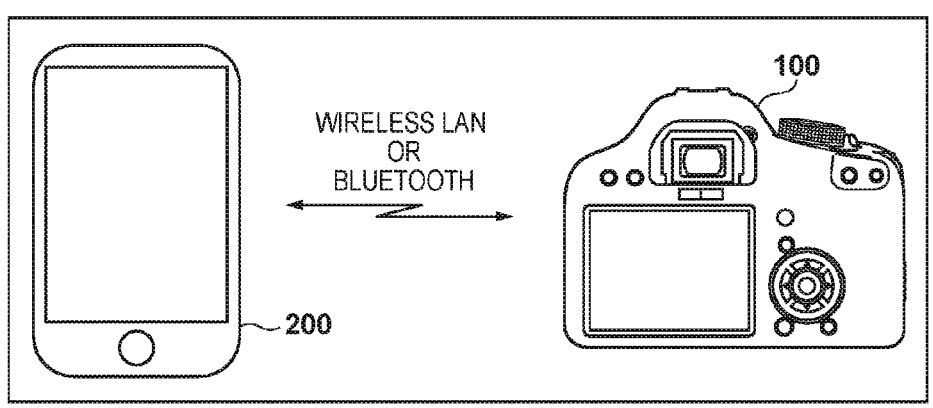

Firstly, explanation is given regarding an overview of handover processing according to the present embodiment, with reference to FIGS. 3A through 3C. FIGS. 3A through 3C schematically illustrate handover processing that uses NFC by the smart phone 200 and the digital camera 100, in a network configuration that is configured by the digital camera 100 and the smart phone 200.

As illustrated in FIG. 3A, the digital camera 100 and the smart phone 200 can mutually perform near field wireless communication by NFC, can communicate by a wireless LAN, and can communicate by Bluetooth, but, in an initial stage, are in a state in which there is no connection for any communication method.

For example, if the smart phone 200 which is equipped with an NFC reader/writer function is caused to neighbor the digital camera 100, as illustrated in FIG. 3B, communication by NFC is initiated between the digital camera 100 and the smart phone 200. By the near field wireless communication by NFC, the digital camera 100 and the smart phone 200 transmit/receive setting information necessary for authentication when establishing a wireless LAN or a Bluetooth connection.

Thereafter, as illustrated in FIG. 3C, the digital camera 100 and the smart phone 200 establish communication by Bluetooth or a wireless LAN, based on the setting information transmitted/received in the near field wireless communication by NFC.

In this way, by using near field wireless communication by NFC to transmit/receive setting information necessary for authentication when establishing a wireless LAN or Bluetooth connection, it is possible to easily perform settings necessary for the wireless LAN or Bluetooth connection as well as establishment of these forms of wireless communication.

By the way, because communication by Bluetooth commonly has lower data transfer speed than communication by the wireless LAN but low power consumption, a persistent connection with a communication partner is possible even with an apparatus for which a power source is driven by a battery. In addition, while Bluetooth requires pairing before apparatuses connect to each other, it is possible to perform pairing by causing them to neighbor one another if handover processing from NFC to Bluetooth is performed. Therefore, if handover processing from NFC to Bluetooth is performed between the digital camera 100 and the smart phone 200, subsequently the connected apparatuses can allow the Bluetooth connection to continue or make a reconnection.

Furthermore, if the connection by Bluetooth is continued, it is possible to further perform handover processing from Bluetooth to a wireless LAN even without causing the apparatuses to neighbor each other. For example, in a case of trying to transmit image data or video data from the digital camera 100 to the smart phone 200, it is possible to perform faster data transmission by performing handover processing from Bluetooth to a wireless LAN. If handover processing from the wireless LAN to Bluetooth is performed when the data transmission terminates, it is possible to cause power consumption for the apparatuses to decrease while maintaining communication. In other words, if a plurality of communication methods are appropriately used, it is possible to aim for simultaneous satisfaction of high speed communication and power saving even with an apparatus that transmits a large amount of data.

Meanwhile, in handover processing that uses near field wireless communication by NFC, while it is possible to easily start communication by neighboring, there are cases in which communication with an external apparatus starts without being intended by just approaching it, and cases in which after sharing data once, performing communication with an external apparatus is not desired. If an external apparatus with which handover processing has been performed once is in a communicable range, there is the possibility that communication by Bluetooth, for example, is automatically established, and internal data is shared in accordance with a setting. Accordingly, considering this security perspective, it is possible to consider a method of restricting each external apparatus to which it is possible to transfer data by approaching it. However, if neighboring communication partners are excessively restricted, there is the possibility that convenience of connection processing that uses NFC will be lost by requiring a cumbersome operation such as temporarily canceling restrictions in accordance with a usage situation, for example.

Accordingly, in the present embodiment, it is determined whether an operation mode of digital camera 100, when neighboring, is a mode for transferring captured image data or the like, and in accordance with the operation mode, communication by Bluetooth or wireless LAN is enabled and switched to from near field wireless communication by NFC. Specifically, if the operation mode is a mode for transferring image data or the like, the digital camera 100 performs handover processing to high-speed communication by a wireless LAN, and temporarily uses wireless LAN communication. For example, if the digital camera 100 is approached when it is displaying captured image data on the display unit 106, it will be determined to be in a mode for transferring the image data or the like, and perform communication with the external apparatus via a wireless LAN. In other words, in a case in which a user shares image data with an apparatus of a third party that has not been registered, it is possible to temporarily establish fast communication by a wireless LAN to share desired data. In contrast, if the operation mode is not a mode for transferring image data or the like, the digital camera 100 performs handover processing to low-speed communication by Bluetooth to continue the connection. However, handover processing to communication by Bluetooth is only performed in a case in which an external apparatus to connect to is an apparatus that has been registered in advance. By performing in this way, it is possible to prevent entering a state in which communication by Bluetooth with an external apparatus having low trustworthiness (for example, an apparatus of a third party or the like) is always possible.

<Series of Operations for Handover Processing Using Near Field Wireless Communication>

Figure 4A:
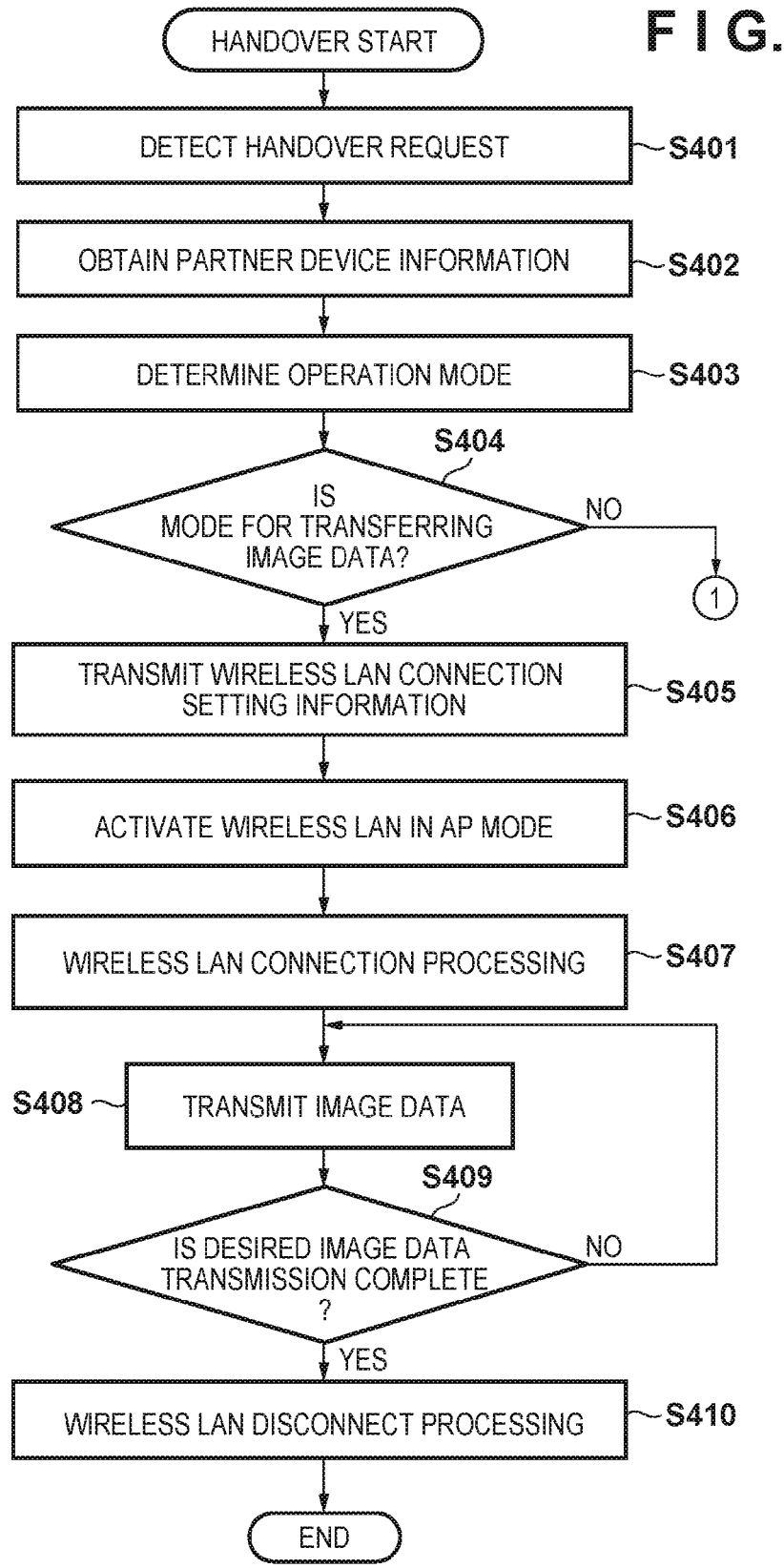
FIGS. 4A through 4B are flowcharts illustrating a series of operations of handover processing that uses near field wireless communication according to a first embodiment.
Figure 4B:
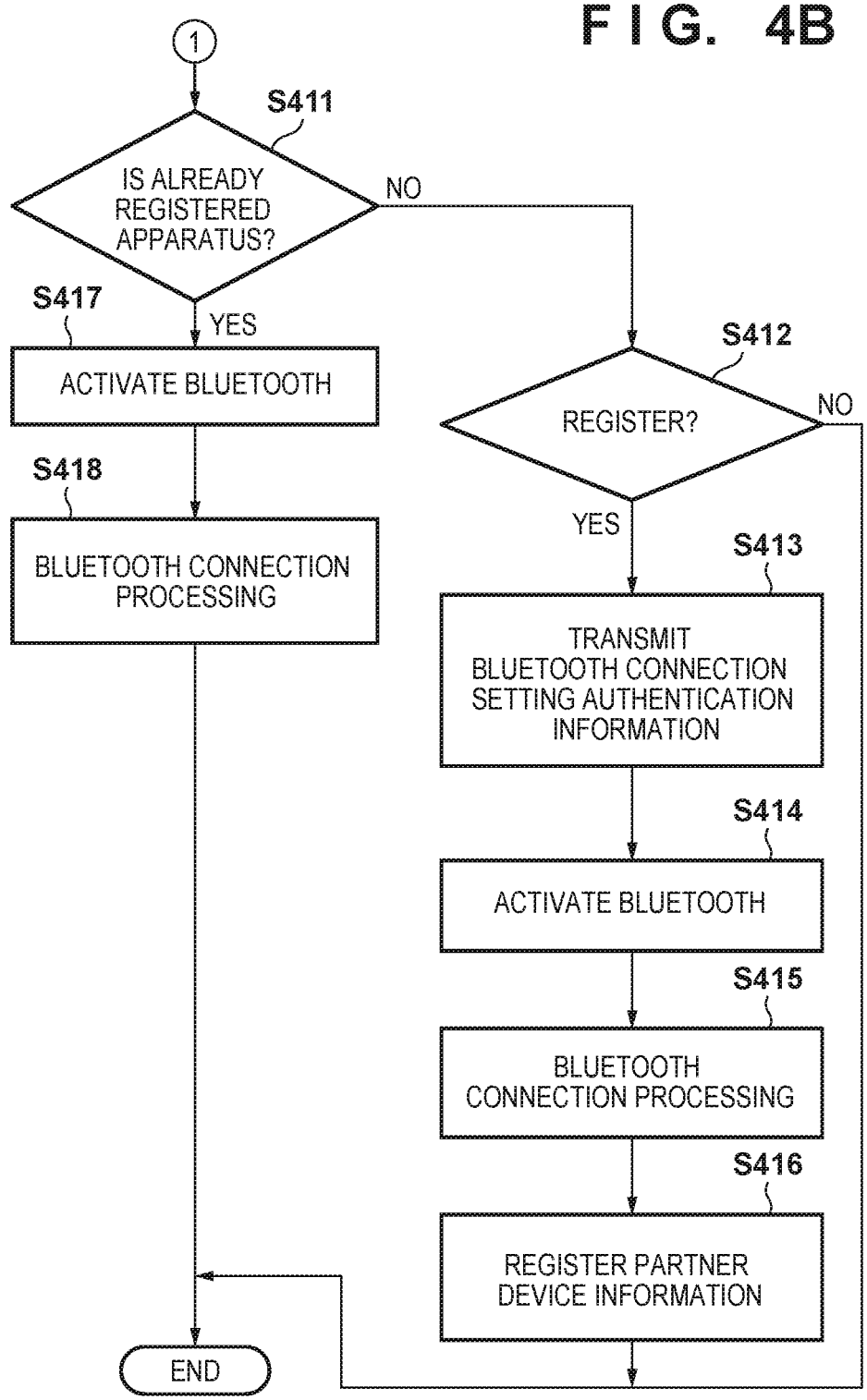

Next, explanation is given regarding handover processing that uses near field wireless communication performed between the digital camera 100 and the smart phone 200, with reference to the flowcharts illustrated in FIGS. 4A through 4B. Note that this processing is started if the smart phone 200 has become close with respect to the digital camera 100.

In step S401, the control unit 101, upon detecting a handover request in the near field wireless communication, in step S402, obtains device information of the smart phone 200 via the near field wireless communication unit 112.

Next, in step S403, the control unit 101 determines an operation mode of the digital camera 100. The determination of the operation mode is by determining whether the digital camera 100 is in a mode for transferring image data. For example, if the image data is being reproduced on the display unit 106 upon starting the near field wireless communication, the control unit 101 determines that the operation mode of the digital camera 100 is a mode for transferring image data. In step S404, the control unit 101, in a case of having determined that the digital camera 100 is in a mode for transferring image data, advances processing to step S405, and, in a case of having determined to not be in a mode for transferring image data, advances processing to step S411.

In step S405, the control unit 101 transmits setting information (for example, an SSID, authentication information or the like) necessary to establish a connection by the wireless LAN via the near field wireless communication unit 112 to the smart phone 200. In the present embodiment, setting information such as a SSID or authentication information may be changed so as to pass different authentication information each time the handover processing is performed. By performing in this way, it becomes necessary to be neighboring again after a connection has expired. In other words, even if an apparatus of a third party to which a handover has been made once enters a communicable range, it is possible to prevent automatically establishing a wireless LAN connection with this device, and it is possible to improve security.

In step S406, the control unit 101 supplies power to the first wireless communication unit 110, and the first wireless communication unit 110 activates in the AP mode. In step S407, upon receiving a wireless LAN connection request from the smart phone 200, the control unit 101 establishes communication by performing processing for a wireless LAN connection between the digital camera 100 and the smart phone 200. Note that, in the present embodiment, configuration is such that communication by wireless LAN is enabled by taking being neighboring as a cue, and is disabled at a separate, predetermined timing. In this way, it is possible to enable a connection with an external apparatus in only a predetermined period, and reduce power consumption by the usage of a wireless LAN.

In step S408, upon establishing communication by wireless LAN, the control unit 101 transmits the image data to the smart phone 200 via the first wireless communication unit 110. The image data to transmit to the smart phone 200 is, for example, the image data reproduced on the display unit 106 of the digital camera 100 when the handover processing started in step S401.

In step S409, the control unit 101 determines whether transmission of desired image data has completed, and if transmission has not completed, processing returns to step S408 again. In this way, if it is set so as to transmit a plurality of pieces of image data, the control unit 101 repeatedly performs transmission processing of image data until transmission of the desired image data has completed. Note that the one or more pieces of image data to be transmitted may be interactively selected via the operation unit 105 in advance. Upon determining that transmission of the desired image data has completed, the control unit 101 advances processing to step S410.

In step S410, the control unit 101 disconnects the wireless LAN connection with the smart phone 200, and stops operation of the first wireless communication unit 110. As described above, the SSID or authentication information necessary for establishing a connection by wireless LAN that was transmitted to the smart phone 200 differs each time the handover processing is executed. After transmission/reception of the image data terminates, the wireless LAN connection is disconnected. When the stopping processing for the wireless LAN completes, the control unit 101 terminates the series of operations for the handover processing.

However, if not being in a mode for transferring image data is determined in step S404, the control unit 101 performs the following processing. In step S411, the control unit 101 determines whether the smart phone 200 is an apparatus that is already registered in the digital camera 100. Specifically, the control unit 101 reads device information of already registered apparatuses from the storage medium 107, for example, and determines whether the device information of the smart phone 200 that was obtained in step S402 matches the read device information. If there is a match for the already registered device information, the control unit 101 determines that the smart phone 200 is already registered. The control unit 101 advances processing to step S417 if there is a determination of already registered. However, if not already registered is determined, it is determined that the smart phone 200 is an unregistered apparatus, and the processing proceeds to step S412.

In step S412, the control unit 101 causes a user to select whether to register the device information of the smart phone 200 in the digital camera 100. For example, the control unit 101 displays a menu screen on the display unit 106 (the menu screen is described later with reference to FIGS. 6A through 6B), and determines whether to register the device information of the smart phone 200 in accordance with a result of selecting by a user. The control unit 101 displays on the menu screen a message to the effect that the smart phone 200 has been detected and whether to register the apparatus, and accepts a user instruction by the operation unit 105.

Note that, if the smart phone 200 is registered in the digital camera 100, it means that, for both apparatuses, there is no need to restrict access to each other or they are in a relation in which there is no security problem even if access is always enabled, such as where an owner of the smart phone 200 and the digital camera 100 is the same. In other words, it is possible to provide the convenience as described above by making the digital camera 100 and the smart phone 200 be in a state in which access by Bluetooth is always enabled. Conversely, even if an apparatus of a third party is caused to neighbor and image data is transmitted to the apparatus, it is possible to prevent access to the digital camera 100 by Bluetooth if the apparatus of the third party is not registered in the digital camera 100. In a case of registering the smart phone 200 in step S412, the control unit 101 advances processing to step S413, and in a case of not registering there is no establishment of communication by Bluetooth and the series of operations terminates.

In step S413, the control unit 101 performs pairing by transmitting, to the smart phone 200 via the near field wireless communication unit 112, a device address or authentication information necessary to establish a connection by Bluetooth.

In step S414, the control unit 101 activates the second wireless communication unit 111. Furthermore, in step S415 the control unit 101 establishes communication by Bluetooth between the digital camera 100 and the smart phone 200, in response to having received a Bluetooth connection request from the smart phone 200 via the second wireless communication unit 111. A user can use the communication by Bluetooth to control the digital camera 100 through the smart phone 200, for example. In such a case, upon a user operating the smart phone 200, the smart phone 200 transmits data that includes a control instruction (for example an image capturing instruction) to the digital camera 100. The control unit 101 continues the connection state for a predetermined period, regardless of whether a user actually performs control of the digital camera 100 through the smart phone 200 (in other words, regardless of the existence or absence of data to be transferred). Because of this, a user can perform control of the digital camera 100 through the smart phone 200 at a desired timing. Note that, because a connection by Bluetooth has lower power consumption than a connection by a wireless LAN, even if the connection state continues for the predetermined period, a problem of wasting power is not terribly large. In addition, after establishment of communication by Bluetooth, communication may be further switched from the second wireless communication unit 111 to the first wireless communication unit 110. Configuration may also be taken such that, at this point, the control unit 101 transmits the authentication information used in the wireless LAN connection via the second wireless communication unit 111 (in other words, by communication by Bluetooth). In addition, configuration may be such that, when transmitting information necessary for a Bluetooth connection in step S413, it is transmitted together with information required for a wireless LAN connection.

In step S416, upon establishing communication by Bluetooth in step S415, the control unit 101 the device information of the smart phone 200, which is a partner device, is registered to the non-volatile memory 103 in the digital camera 100, and the series of operations of this processing terminates. Note that an apparatus registered in the digital camera 100 is called a "self-owned apparatus" in the present embodiment.

However, if the smart phone 200 not being an already registered apparatus is determined in step S411, the control unit 101 performs the following processing. In step S417, the control unit 101 activates the second wireless communication unit 111. In step S418, Bluetooth connection processing with the smart phone 200 that was determined to be an already registered apparatus in step S411 is performed. Thereafter, the control unit 101 terminates the series of operations for this processing.

In this way, if the smart phone 200 executes the handover processing in response to neighboring the digital camera 100, a communication method by which to perform the handover is switched in accordance with whether the digital camera is in a mode for transferring image data. Accordingly, if sharing image data with a smart phone 200 that is an apparatus of a third party, communication by a comparatively fast wireless LAN is switched to, temporarily enabling sharing of image data with the apparatus.

Meanwhile, if not in an operation mode of transferring image data, Bluetooth, which has comparatively low power consumption, is switched to. If connected by Bluetooth, it is possible to switch the communication method from communication by Bluetooth to faster communication by a wireless LAN, without causing the smart phone 200 to neighbor the digital camera 100 again. In addition, if the smart phone 200 is already registered such as by having the same owner as the digital camera 100, the smart phone 200 can also easily use a function provided to an external apparatus (in accordance with a setting of the digital camera 100) via Bluetooth communication.

<Sequence for Handover Processing Using Communication by Bluetooth>

Furthermore, explanation is given with reference to FIG. 5 regarding a sequence for switching a communication method from communication by Bluetooth established between the digital camera 100 and the smart phone 200 to a wireless LAN. Note that the sequence is started from a state in which the digital camera 100 is connected to the smart phone 200 by Bluetooth.

In step S501, the control unit 201 of the smart phone 200 detects a user operation such as obtaining an image or performing remote control. Next, in step S502, the control unit 201 of the smart phone 200 transmits a request to handover to a wireless LAN to the digital camera 100 via the second wireless communication unit 211 (in communication by Bluetooth).

In step S503, the control unit 101 transmits connection information such as an SSID or authentication information required for connection by a wireless LAN to the smart phone 200 via the second wireless communication unit 111. Note that it is possible to omit step S503 if an SSID or authentication information for a wireless LAN is transmitted by the near field wireless communication unit 112 in step S405.

In step S504, the control unit 101 supplies power to the first wireless communication unit 110 to activate in the AP mode. In step S505, in the communication by Bluetooth, a handover start response is transmitted to the smart phone 200, and the second wireless communication unit 111 is controlled to stop communication by Bluetooth.

In step S506, upon receiving the handover start response via the second wireless communication unit 211 of the smart phone 200, the control unit 201 controls the second wireless communication unit 211 to stop communication by Bluetooth, and supplies a power source to the first wireless communication unit 210.

In step S507, the control unit 201 uses the wireless LAN connection information received in step S503 to transmit a wireless LAN connection request to the digital camera 100, which has activated in the AP mode.

In step S508, the control unit 101 establishes communication by the wireless LAN with the smart phone 200, based on wireless LAN authentication information. When communication by wireless LAN is established, the control unit 101 can, via the first wireless communication unit 110, transmit image data saved on the digital camera 100 or receive a remote control from the smart phone 200.

<Registration Screen for Device>

Figure 6A:
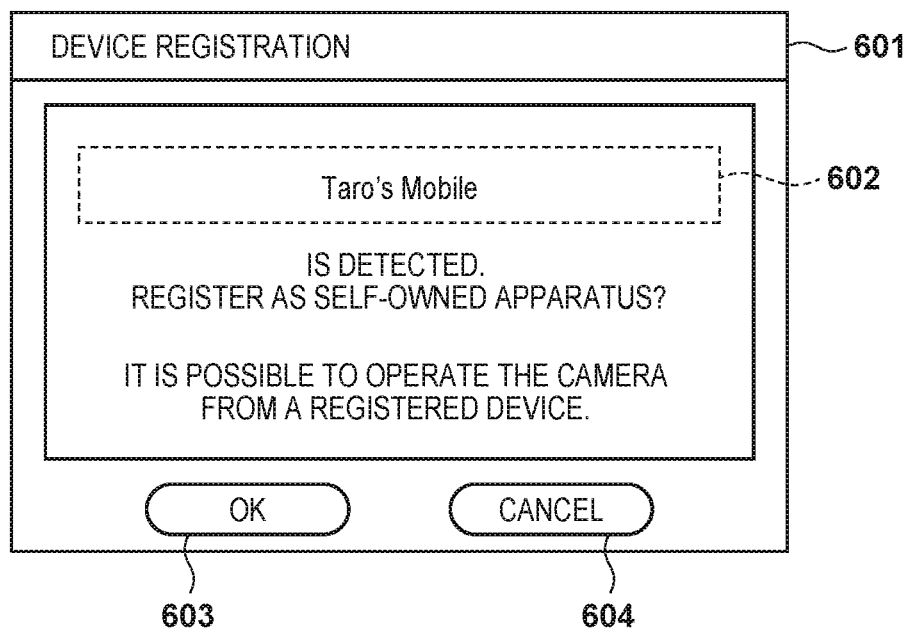
FIGS. 6A through 6B are views for illustrating screens for registering an external apparatus according to embodiments.
Figure 6B:
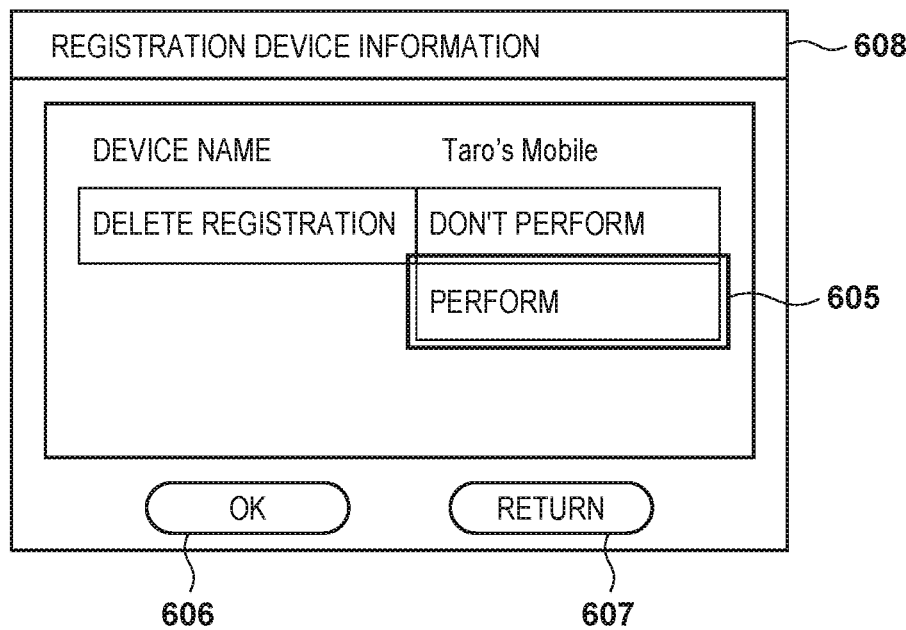

Explanation with reference to FIGS. 6A through 6B is given of a device registration screen displayed on the display unit 106 when registering the smart phone 200 in the digital camera 100.

A "device registration" screen 601 illustrated in FIG. 6A is displayed in step S412 that was explained with FIG. 4B. In the present embodiment, a device name 602 of the smart phone 200, included in the device information obtained in step S402, is displayed in a display area as "Taro's Mobile". An OK icon 603 is an icon representing a button that a user selects when registering an external apparatus displayed in the device name 602. A CANCEL icon 604 is an icon representing a button for cancelling registration of a device.

A "registration device information" screen 608 illustrated in FIG. 6B is a screen for confirming information of an external apparatus registered as a "self-owned apparatus" in the digital camera 100, or deleting a registered device. A user can select a desired item such as "perform", for example, by operating the operation unit 105 to cause a selection cursor 605 to go up or down. An OK icon 606 is an icon representing a button for finalizing an item selected by a user causing the selection cursor 605 to move up or down. A RETURN icon 607 is an icon representing a button that a user presses when they are finished with this screen.

<Image Sharing>

Figure 7A:
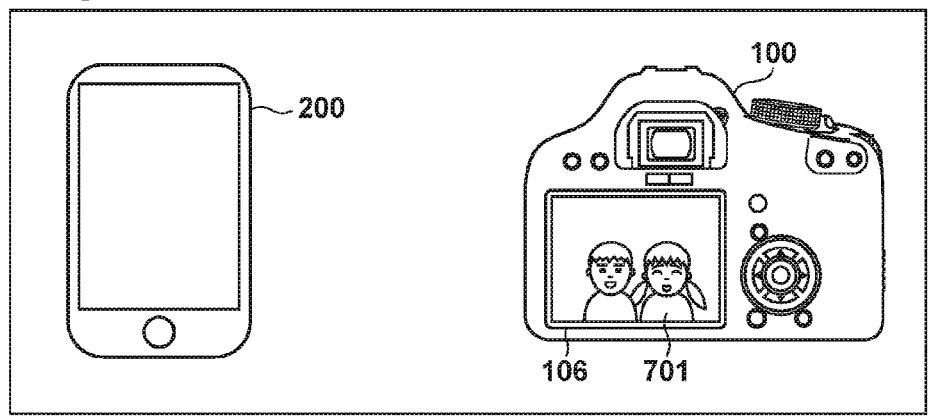
FIGS. 7A through 7C are views for explaining handover processing at a time of reproducing image data, according to embodiments.
Figure 7B:
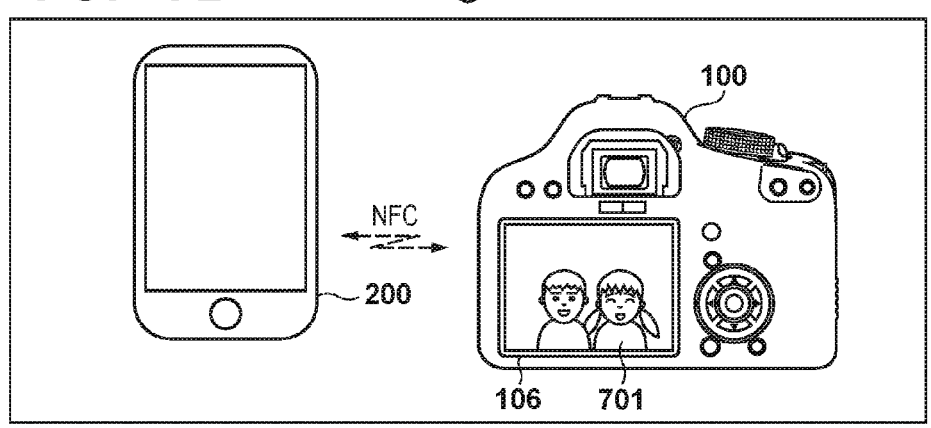
Figure 7C:
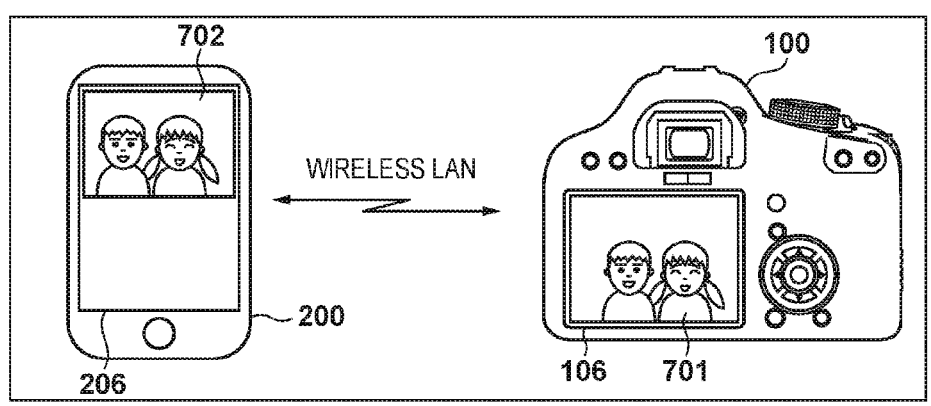

Next, explanation with reference to FIGS. 7A through 7C is given of an example in which an image is shared, when the smart phone 200 is caused to be neighboring while the digital camera 100 is in a state of reproducing the image.

As illustrated in FIG. 7A, image data 701 is being reproduced in the display unit 106 of the digital camera 100. If a user has pressed the reproduction button 105b, the control unit 101 reads the image data 701, which is stored in the storage medium 107, and causes it to be displayed in the display unit 106. Note that a user selects desired image data from image data stored in the storage medium 107, and performs a reproduction instruction by operating the operation unit 105.

FIG. 7B illustrates a state in which the smart phone 200 has approached the digital camera 100, in a state in which the image data 701 is being reproduced in the display unit 106. The digital camera 100 and the smart phone 200 uses their respective near field wireless communication unit to transmit/receive setting information necessary for authentication when connecting. At this point, the operation mode of the digital camera 100 is a mode for transferring image data because image data is being reproduced in the display unit 106. Note that, as described above in step S405, the control unit 101 transmits, for example, authentication information necessary for communication by wireless LAN via near field wireless communication by NFC to the smart phone 200.

In FIG. 7C, the digital camera 100 and the smart phone 200 use their respective first wireless communication unit to establish a connection by a wireless LAN, and the digital camera 100 transfers the image data 701 being reproduced on the display unit 106 to the smart phone 200. In the smart phone 200, the control unit 201 reproduces received image data 702 to display it in the display unit 206, and also stores it in the storage medium 207.

Note that FIGS. 7A through 7C illustrate cases in which the operation mode is a mode for transferring image data, and one image is being reproduced in the display unit 106. However, similar application is possible even in a case in which a plurality of images to transfer are selected. In addition, configuration may be taken so that a user can select in advance a plurality of pieces of image data to transfer. In addition, if the smart phone 200 uses the digital camera 100 as an image server, whether the digital camera 100 is operating as an image server may be further determined.

<Image Selection Screen>

Figure 8:
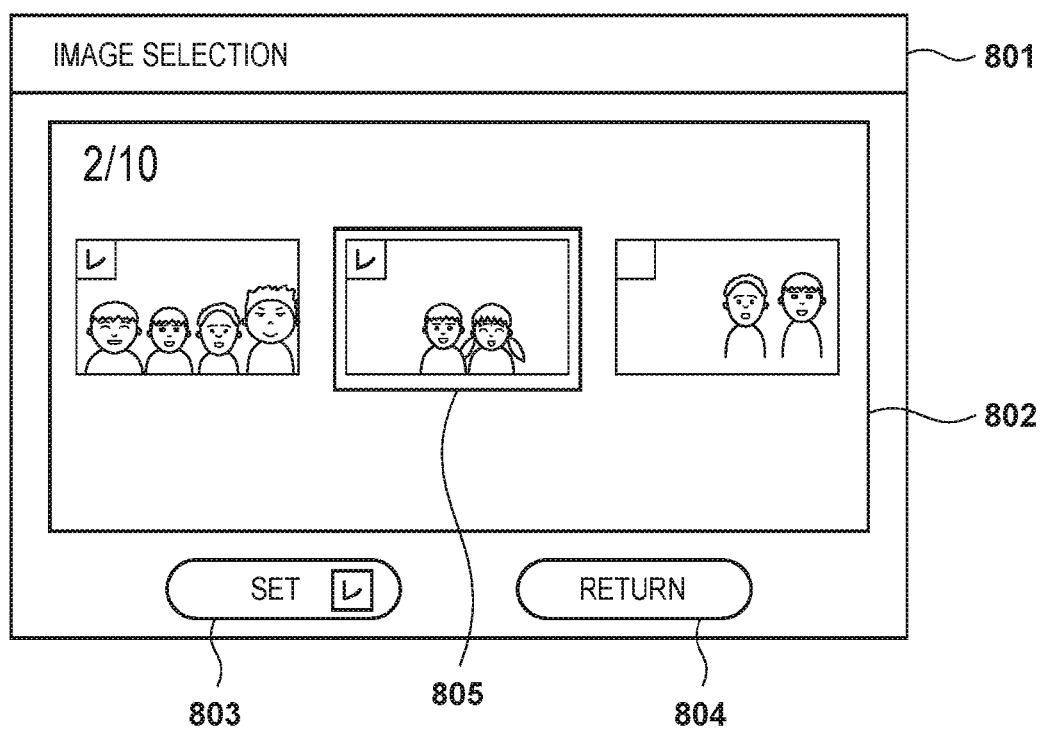
FIG. 8 is a view illustrating a screen for selecting image data according to embodiments.

Additionally, explanation with reference to FIG. 8 is given of an example of a menu screen for when a user selects a plurality of pieces of image data.

An "image selection" screen 801 is a menu screen for a user to select a plurality of images. Here, three images are displayed in an image display region 802, and check marks are displayed on each selected piece of image data. In the example illustrated in FIG. 8, from all images stored in the storage medium 107 (for example, ten images), that two images have been selected is illustrated. A SET icon 803 is an icon representing a button for instructing selection or non-selection of an image for transmission. An image cursor 805 is an icon representing a button for instructing whether to transmit selected images. A RETURN icon 804 is an icon representing a button for terminating the image selection menu. Pieces of image data selected by this screen are transmitted to the smart phone 200 by the handover processing explained with FIGS. 7A through 7C.

Note that various other methods can be applied as a method for selecting a plurality of pieces of image data. For example, a sharing designation representing that provision to an external apparatus is possible or a private designation representing that provision is prohibited may be set for each piece of image data stored in the storage medium 107. In such a case, only image data having a sharing designation becomes a target of transmission to the smart phone 200, which is a connection partner.

In addition, in the present embodiment, in the determination of an operation mode, whether in a mode for transferring image data is determined. However, data that is a transfer target may, for example, be predetermined data that is obtained by the digital camera 100, for example data such as video data or voice data. In addition, for determination of an operation mode, a case of reproducing (or displaying) predetermined data obtained by the digital camera 100 in the display unit 106 may be determined to be a mode for transferring such predetermined data.

In the present embodiment, as described above, if an external apparatus has become close, control is performed so as to switch from near field wireless communication to whichever wireless communication, in accordance with whether the operation mode is a mode for transferring image data. In other words, control is performed so as to, if in a mode for transferring image data, temporarily enable communication by wireless LAN so as to share the image data with a third party, and in contrast, if not in a mode for transferring image data, enabling communication by Bluetooth which enables a persistent connection. In this way, it becomes possible to use an appropriate communication method in a case of sharing data with an external apparatus equipped with a plurality of wireless communication methods. In addition, it is possible to restrict access to the digital camera 100 even if a third party unintentionally approached, by limiting switching to communication by Bluetooth, which enables a persistent connection, to only a registered external apparatus.

Second Embodiment

Next, explanation is given for a second embodiment. In the second embodiment, explanation is given for handover processing for a case in which another external apparatus (a smart phone 300) has approached at a time when the smart phone 200 is already registered in the digital camera 100. In the first embodiment, the digital camera 100 is configured so as to not enable communication by wireless LAN with an apparatus of a third party if the operation mode is not a mode by which transferring image data is possible. In contrast to this, in the present embodiment, the digital camera 100 enables communication by wireless LAN so as to temporarily connect with a third party when an already registered self-owned apparatus is present, even if the operation mode is not a mode by which transferring image data is possible. Note that configurations of the digital camera 100, the smart phone 200, and the smart phone 300, which have communication function according to the present embodiment are similar to as in the first embodiment. Accordingly, for the same configurations or the same steps in the drawings referenced in the explanation of the present embodiment, the same reference numeral is attached, duplicate explanations are omitted, and points of difference are predominantly explained.

<Overview of Handover Processing>

Figure 9A:
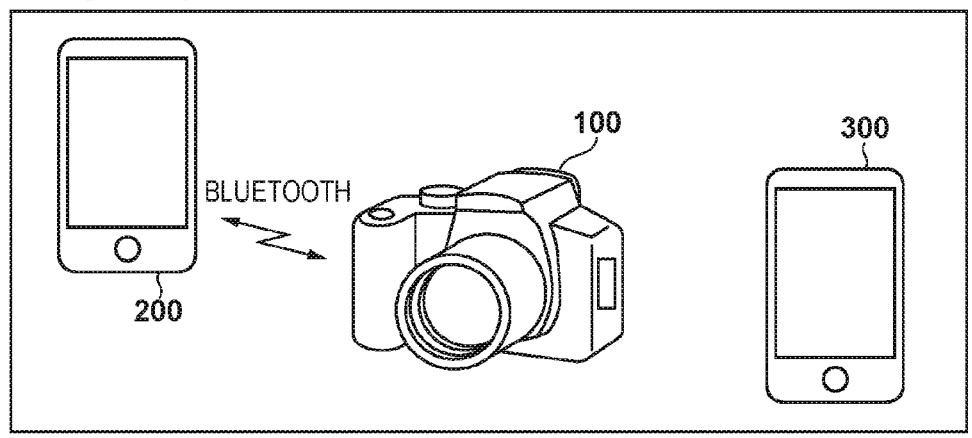
FIGS. 9A through 9C are views for explaining an overview of handover processing according to a second embodiment.
Figure 9B:
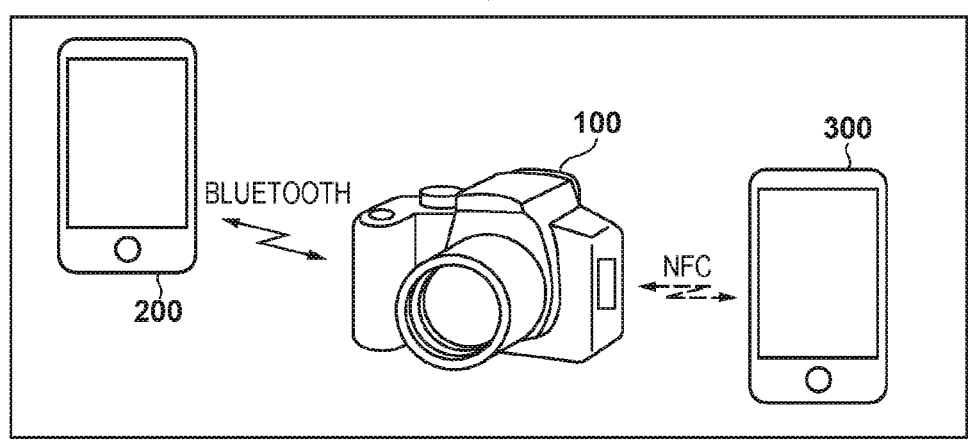
Figure 9C:
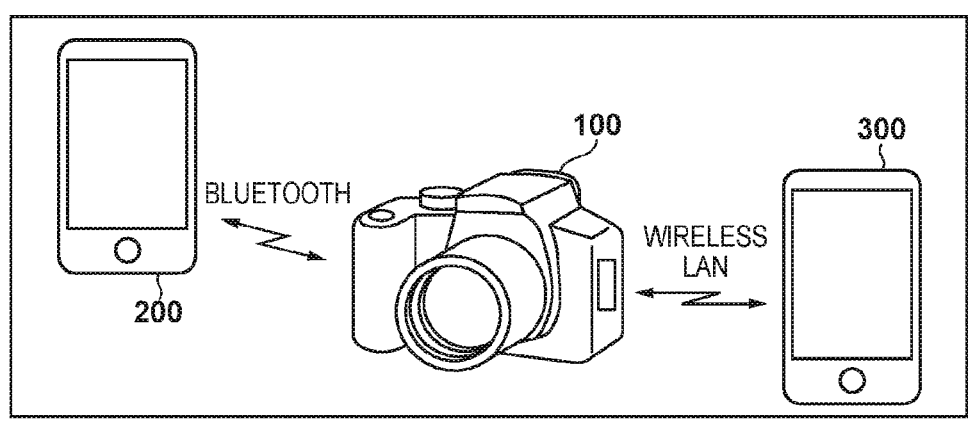

FIGS. 9A through 9C schematically illustrate handover processing that uses near field wireless communication by NFC, in a network configuration comprising the digital camera 100 and a plurality of smart phones 200 and 300. Note that, in the example illustrated in FIGS. 9A through 9C, explanation is given in which the smart phone 200 is an apparatus registered in the digital camera 100 as a self-owned apparatus, and the smart phone 300 is an apparatus that is not registered as a self-owned apparatus. Note that, in the present embodiment, if a self-owned apparatus (here, the smart phone 200) registered in the digital camera 100 is present, another external apparatus (here, the smart phone 300) is handled as an external apparatus of a third party regardless of who the owner is.

FIG. 9A illustrates an initial connection state for each apparatus. In other words, the digital camera 100 and the smart phone 200 which is registered as a self-owned apparatus are in a state of being connected by using communication by Bluetooth, and the smart phone 300 is in a state of not being connected to either apparatus.

FIG. 9B illustrates the connection state when the smart phone 300 that was in the state of FIG. 9A has approached the digital camera 100. It is illustrated that, by the smart phone 300 having approached the digital camera 100, the digital camera 100 and the smart phone 300 establish near field wireless communication by NFC. Because the smart phone 200 is registered as a self-owned apparatus, in this example, communication by Bluetooth is continued between the digital camera 100 and the smart phone 200. Note that details of the handover processing according to that the smart phone 300 has approached the digital camera 100 are described later with reference to the flowchart of FIG. 10.

FIG. 9C illustrates a connection state after handover processing between the smart phone 300 and the digital camera 100 is executed. In this example, the smart phone 300 and the digital camera 100 are connected by using communication by a wireless LAN.

In other words, if a new external apparatus has becomes close, it is possible to predict that the new external apparatus is an apparatus of a third party because the digital camera 100 has already registered a self-owned apparatus. In such a case, in response to a new external apparatus having become close, by enabling communication by wireless LAN so as to temporarily connect and perform handover processing, it is possible to improve the security of a connection when sharing data.

<Series of Operations for Handover Processing Using Near Field Wireless Communication>

Next, explanation with reference to FIG. 4A and FIG. 10 is given regarding a series of operations for handover processing when the smart phone 300 has approached the digital camera 100. Note that step S411 through step S418 in the present flowchart are similar to in the first embodiment, where the connection partner device is the smart phone 200. In the following explanation, a case in which the operation mode of the digital camera 100 is not a mode for transferring image data and the smart phone 300 is in a state of not being registered in the digital camera 100 (in other words, is not a self-owned apparatus) is predominantly explained.

Firstly, when the smart phone 300 neighbors the digital camera 100, the digital camera 100 executes steps S401-S404 shown in FIG. 4A and then processing proceeds to step S411. Furthermore, in step S411, the control unit 101 determines that the smart phone 300 is not registered in the digital camera 100, and advances processing to step S1001.

In step S1001, the control unit 101 determines whether there is an apparatus registered as a "self-owned apparatus" in the digital camera 100. The control unit 101 reads device information of already registered apparatuses from the storage medium 107, for example, and if the number of already registered apparatuses is 0 (in other words, there are none), advances processing to step S1002. However, if the number of already registered apparatuses (for example, the smart phone 200) is one or more (in other words, there is an apparatus), processing proceeds to step S1003.

In step S1002, because an already registered smart phone is not present, the control unit 101 causes a user to select whether to newly register the smart phone 300 in the digital camera 100 as a "self-owned apparatus", and determines whether to register the smart phone 300 based on the result of selecting. As a method for causing a user to select whether or not to register, the control unit 101 displays a message for whether to perform registration in the display unit 106 of the digital camera 100 as illustrated in FIG. 6A for example, and receives the result of selecting by the operation unit 105. The control unit 101, if a user selects to register the smart phone 300 as a "self-owned apparatus", advances processing to step S413, and if not registering is selected advances processing to step S1003. Note that processing of step S413 and after in the case that the user selected registration of the smart phone 300 is similar to as in the first embodiment, and communication by Bluetooth is established.

In step S1003, the control unit 101 determines whether to connect to the smart phone 300. For example, the control unit 101 may determine whether to connect based on a user selection. In other words, in the state illustrated by FIG. 9B, the control unit 101 causes the display unit 106 to display a message, and causes a user to select whether to connect to the smart phone 300. If a user does not permit a connection to the smart phone 300, the control unit 101 terminates this series of processes. However, if a user has permitted a connection to the smart phone 300, the control unit 101 advances processing to step S1004, and transmits an SSID or authentication information necessary for connecting by a wireless LAN to the smart phone 300 via the near field wireless communication unit 112. Here, if, for the SSID or authentication information transmitted to the smart phone 300, different values are made to be transmitted each time, it becomes possible to permit a temporary connection, and it is possible to improve security.

In step S1005, the control unit 101 activates the first wireless communication unit 110 in the AP mode. In step S1006, in response to a connection request from the smart phone 300, wireless LAN connection processing is performed with the smart phone 300 to establish a connection.

In step S1007, in processing after communication by wireless LAN with the smart phone 300 has been established, the control unit 101 transmits data via the communication by the wireless LAN in response to a request from the smart phone 300, for example. At this point, the control unit 101 may restrict functions that the smart phone 300 is capable of requesting with respect to the digital camera 100. For example, the digital camera 100 appropriately adds restrictions for control performed remotely from the smart phone 300 for changes such as an image capturing condition or an image capturing instruction with respect to the digital camera 100, viewing of image data that the digital camera 100 shares with an external apparatus, or the like. The control unit 101 makes only images that have a sharing designation or images selected to be transmittable as described above with FIG. 8, for example, viewable from the smart phone 300.

In step S1008, the control unit 101 cuts the wireless LAN connection with the smart phone 300, and stops operation of the first wireless communication unit 110. Upon communication by wireless LAN with the smart phone 300 being cut, the control unit 101 terminates this series of processes.

Note that, in the present embodiment, configuration was taken so that, if there is even just one apparatus that is already registered in the digital camera 100 in step S1001, then communication by wireless LAN with the smart phone 300 is enabled. However, configuration may be taken such that, if a number of already registered external apparatuses is less than a predetermined number, it is possible to register the smart phone 300 as a self-owned apparatus based on a user instruction (Yes in step S1002), and thereafter perform handover processing to communication by Bluetooth.

In the present embodiment, as explained above, if the digital camera 100 performs connection processing with an external apparatus, whether there is an external apparatus registered as a self-owned apparatus in the digital camera 100 is determined. Configuration is such that, if an external apparatus is already registered in the digital camera 100, for an external apparatus for which to newly perform connection processing, similarly to for an apparatus of a third party, communication by wireless LAN is enabled and handover processing is performed. In other words, if the digital camera 100 is already registered as a "self-owned apparatus", in a case of connecting with the smart phone 300, a wireless LAN for performing a temporary connection (that is, performing a restricted connection) is enabled, and a handover is performed. In this way, if already connected with a "self-owned apparatus", in a case of newly connecting to an external apparatus to share data, it is possible to use an appropriate communication method for improving the security of the connection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168137, filed Aug. 27, 2015, which is hereby incorporated by reference herein in its entirety.

What is claimed is:

1. A communication apparatus, comprising:
a memory that stores instructions;
a processor that executes the instructions;
a first wireless communication interface configured to communicate with an external apparatus by a first communication method;
a second wireless communication interface configured to communicate by a second communication method different than the first communication method; and
a near field wireless communication interface configured to perform communication by near field wireless communication,
wherein the processor executes instructions to register one or more external apparatuses and to enable, in accordance with having performed near field wireless communication with an external apparatus by using the near field wireless communication interface, communication by the first wireless communication interface or the second wireless communication interface to perform communication with the external apparatus,
wherein, in a case where an operation mode of the communication apparatus is a predetermined operation mode for transferring predetermined transfer target data, communication is enabled by the first wireless communication interface,
wherein, in a case where the operation mode of the communication apparatus is not the predetermined operation mode and the external apparatus has been registered in advance, communication is enabled by the second wireless communication interface, and
wherein, in a case where the operation mode of the communication apparatus is not the predetermined operation mode and the external apparatus has not been registered in advance, processing is enabled for registering, using the second wireless communication interface, the external apparatus.

2. The apparatus according to claim 1, wherein processing for registering the external apparatus includes inputting a user instruction for registering the external apparatus.

3. The apparatus according to claim 2, wherein, in a case where the operation mode of the communication apparatus is not the predetermined operation mode and there is another external apparatus that has been registered in advance, communication by the first wireless communication interface is enabled without enabling communication by the second wireless communication unit in accordance with near field wireless communication with the external apparatus being performed by using the near field wireless communication interface.

4. The apparatus according to claim 1, wherein, in a case where communication by the first wireless communication interface is enabled, communication is disconnected upon completion of transferring of the transfer target data, and in a case where communication by the second wireless communication interface is enabled, communication is continued for at least a predetermined period regardless of existence or absence of data to be transferred by the communication.

5. The apparatus according to claim 4, wherein while the external apparatus and the communication apparatus continue communication by the second wireless communication interface, in a case where a request for enabling the first wireless communication interface is received via the second wireless communication interface, the processor enables communication by the first wireless communication interface to perform communication with the external apparatus.

6. The apparatus according to claim 1, further comprising a display configured to display the transfer target data reproduced,
wherein, in a case where there is a state in which the transfer target data is displayed in the display, the processor determines the operation mode of the communication apparatus to be the predetermined operation mode.

7. The apparatus according to claim 1, wherein communication by the second wireless communication interface has lower power consumption than communication by the first wireless communication interface and has a broader communicable range than the near field wireless communication by the near field wireless communication interface.

8. The apparatus according to claim 1, wherein the near field wireless communication interface transmits to the external apparatus at least one of setting information necessary when establishing communication by the first wireless communication interface and setting information necessary when establishing communication by the second wireless communication interface.

9. The apparatus according to claim 1, wherein the near field wireless communication by the near field wireless communication interface is near field wireless communication by NFC,
wherein communication by the first wireless communication interface is communication by a wireless LAN, and
wherein communication by the second wireless communication interface is communication by Bluetooth.

10. A control method of a communication apparatus which comprises a memory that stores instructions and a processor that executes the instructions, a first wireless communication interface for communicating by a first communication method with an external apparatus, a second wireless communication interface for communicating by a second communication method different than the first communication method, and a near field wireless communication interface for communicating by near field wireless communication, the method comprising the steps of:
registering one or more external apparatuses; and
enabling, in accordance with having performed near field wireless communication with an external apparatus by using the near field wireless communication interface, communication by the first wireless communication interface or the second wireless communication interface to perform communication with the external apparatus, wherein
in a case where an operation mode of the communication apparatus is a predetermined operation mode for transferring predetermined transfer target data, communication is enabled by the first wireless communication interface,
in a case where the operation mode of the communication apparatus is not the predetermined operation mode and the external apparatus has been registered in advance, communication is enabled by the second wireless communication interface, and
in a case where the operation mode of the communication apparatus is not the predetermined operation mode and the external apparatus has not been registered in advance, the external apparatus is registered using the second wireless communication interface.

11. A non-transitory computer-readable storage medium storing a program for causing a computer to function as a communication apparatus comprising a memory for storing instructions, a processor for executing the instructions, a first wireless communication interface for communicating by a first communication method with an external apparatus, a second wireless communication interface for communicating by a second communication method different than the first communication method, and a near field wireless communication interface for communicating by near field wireless communication, the program functioning to:
register one or more external apparatuses; and
enable, in accordance with having performed near field wireless communication with an external apparatus by using the near field wireless communication interface, communication by the first wireless communication interface or the second wireless communication interface to perform communication with the external apparatus, wherein,
in a case where an operation mode of the communication apparatus is a predetermined operation mode for transferring predetermined transfer target data, communication is enabled by the first wireless communication interface,
in a case where the operation mode of the communication apparatus is not the predetermined operation mode and the external apparatus has been registered in advance, communication is enabled by the second wireless communication interface, and
in a case where the operation mode of the communication apparatus is not the predetermined operation mode and the external apparatus has not been registered in advance, the external apparatus is registered using the second wireless communication interface.

* * * * *